Feb. 11, 1941.   B. T. ROSEBERRY ET AL   2,231,482
AUTOMOBILE SIGNALING DEVICE
Filed Dec. 20, 1937
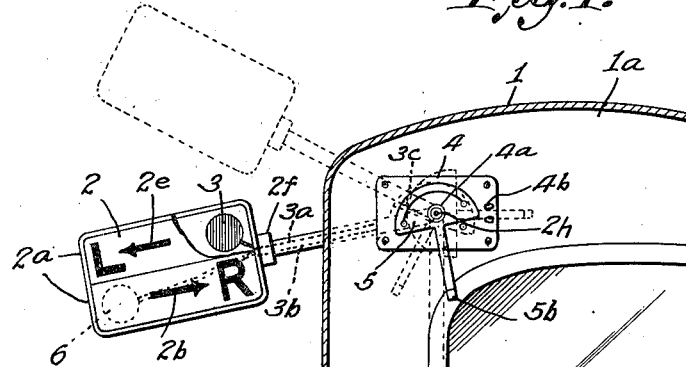
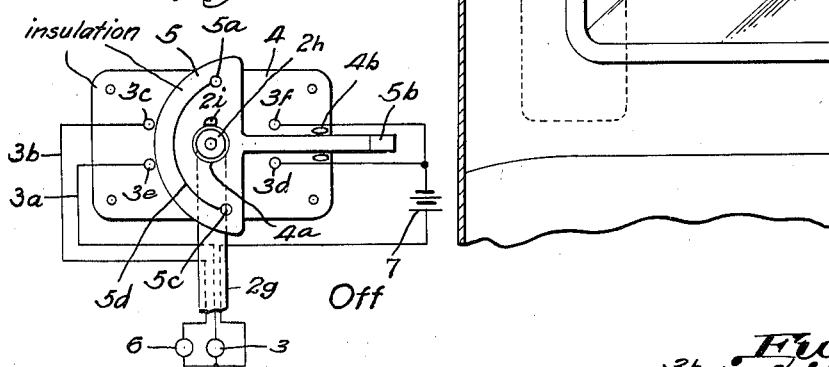
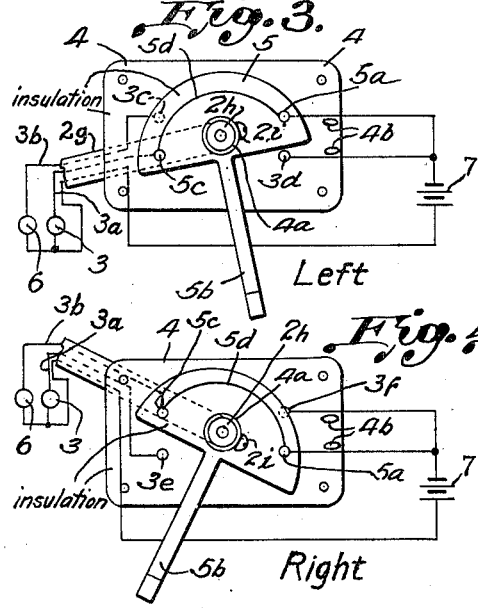
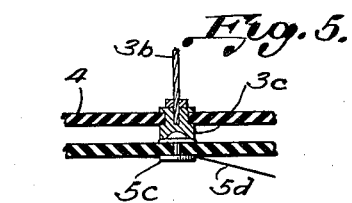
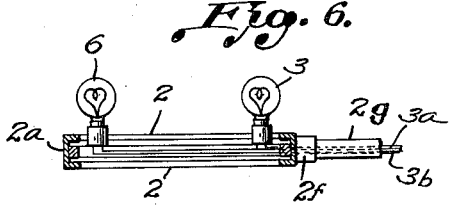
Inventors
Beegle T. Roseberry and
Christ H. Kowalske, by
G. C. Kennedy,
Attorney.

Patented Feb. 11, 1941

2,231,482

UNITED STATES PATENT OFFICE 2,231,482

AUTOMOBILE SIGNALING DEVICE

Beegle T. Roseberry, Cedar Falls, Iowa, and Christ H. Kowalski, Scotland, S. Dak.

Application December 20, 1937, Serial No. 180,730

2 Claims. (Cl. 177—327)

Our invention relates to improvements in automobile signaling devices, and the principal object thereof is to provide for self-propelled or other vehicles duplex signaling devices to indicate either a left-hand or a right-hand turning thereof.

Another object of our improvements is to furnish distinctive lamps for these devices in loop circuits, both circuits being normally open, and to combine therewith manually controllable make and break means shiftable to close either circuit while leaving the other circuit open, whereby either lamp may be distinctively energized to indicate a proposed left or right hand turning of the vehicle.

Another object of our improvements is to mount said lamps upon a single semaphore for their convenient use to indicate such a proposed left or right hand turning of the vehicle, and to provide means for raising or lowering the semaphore manually while at the same time causing the energization of one or the other lamp thereon, or when the semaphore is lowered to open the circuit in use.

Another object of our improvements is to furnish a rockable switch device including contact elements for the respective terminals of the conductor loops, whereby the switch may be employed in closing either circuit at will through the selected lamp for left or right hand turning of the vehicle, the switch device being mechanically connected to the semaphore also, whereby the switch may be used in rocking the semaphore at the same time its contacts are employed in closing the selected circuit through the signal lamp to be actuated for either a left hand or a right hand turning of the vehicle.

These objects we have accomplished by the means which are herein illustrated and described. It is also to be understood that various changes may be effected in the said devices to accomplish said purposes, without departing from the invention or the protection of the appended claims.

Fig. 1 denotes a partial transverse section of the upper part of an automobile body immediately to the rear of the front wall thereof, showing the extended semaphore of the signal device before it and the manually operable switch mounted within the body, the broken lines indicating the lowered position of the semaphore. Figs. 2 to 4 inclusive are enlarged similar elevations of the switch device including the electrical loops in each and a battery 7 for illuminating either of the semaphore lamps. Fig. 5 is an enlarged partial cross section showing elements or contact devices mounted in coacting relation upon a backing insulating plate and a manually operable insulating operating lever device. Fig. 6 is an enlarged longitudinal section of the lamp-carrying semaphore.

Like numerals designate like elements throughout the several views.

The numeral 1 denotes a front upper portion of an automobile body including a wind-shield, 1a indicating the front wall and roof portions of the body. A box type semaphore arm having a circumferential inwardly flanged frame 2a has spaced front and rear glass side plates 2, the frame 2a having a medial inwardly threaded hollow boss 2f seating therein an outwardly extending hollow arm 2g terminating with a rearwardly bent part 2h traversing rockably the front wall 1a to project therefrom and through a hollow insulating boss 4a fixed centrally on and being a part of a rectangular insulating plate 4 fastened by screws to said front wall, with a screw 2i securing said parts together removably.

Electric lamps 3 and 6 are mounted upon the front glass pane of the semaphore 2—2a to project forwardly, and offset from each other laterally in diagonally opposite places, although they may be offset vertically instead. Their conducting wires 3a and 3b are carried thence through the hollow boss 2f and arm 2g and through orifices in the inner end 2h of the latter and through the wall 1a and insulating plate 4 at different locations to terminate at the rear face of the plate in slightly projecting heads as exemplified in Fig. 5 at 3c, the rear ends or parts of the heads being preferably bosses with central cavities. The convex contacts 5a and 5c on the moving switch sector cooperate with the concave contacts on the base 4, to position the signal in operating positions. When the switch body is rocked in opposite directions to illuminate one or the other of the lamps its motion is either way from a neutral position in which the signal is horizontal and the handle is at right angles to the position the handle assumes when the signal is down. The wires leading from the stationary contacts to the arm 2g have a loop at the entrance to the arm so that sufficient play to allow for motion of the arm is obtained.

The lamps 3 and 6 should be of contrasting colors, preferably the lamp 3 may be red and the lamp 6 green. Other warning designations may be added to said semaphore, viz.; accompanying the red lamp 3 may be an indicating arrow 2e directed to a letter L denoting the signal for a left hand turn of the vehicle. In like manner in the lower part of the semaphore may be placed the designations of an arrow 2b directed to a letter R to indicate a right turn. But one pair of the lamps are shown projecting from the front part of the semaphore, but like lamps may be placed on the rear part if desired, properly connected to the wires at 3a and 3b in series.

The numeral 5 denotes a rockable body of insulation integral with the collar 4a secured upon the arm 2g on its rearwardly turned portion 2h and carrying an integral crank arm 5b as a handle.

The rockable switch body 5 has as shown in Fig. 5, an opposite pair of contact studs 5a and 5c which project toward the plate 4 and are adapted to contact with the terminals 3c—3d, or 3e—3f at times as the body 5 is rocked in either of opposite directions away from the neutral position. The studs 5a and 5c are connected by a conductor 5d. Figs. 3 and 4 thus show respectively the switch positions for the left and right signals. When the signal is in its down position the switch part 5b lies between slightly projecting convex bosses 4b as shown in said Fig. 2, permitting springing of the handle part 5b over one of the bosses, which latter normally retain the signal in place in the down position.

In Fig. 2 is shown the wiring diagram. Conductor loops 3a and 3b are normally open in each case at their terminals 3c and 3d, and 3e and 3f on the insulating plate 4. These terminals are so arranged on said plate that, as the switch body 5 is rocked in either of opposite directions from the neutral position by means of the crank handle 5b, the body 5 yields causing the contacts 5c and 5a to contact with said terminals releasably to close either loop by way of the conductor 5d, and therewith to the lamp 3 or to the lamp 6 respectively to light the lamp then in circuit, and as the handle 5b is thus rocked the arm 2g is rocked therewith to place the semaphore 2 in an approximately horizontal signaling position to display either an illuminated red or green light as a left or right turn signal and the operator manually holds the handle up until released.

As shown in dotted lines in Fig. 1, the arm 5b may be rocked oppositely from the extended position of the semaphore to place the latter in the inoperative position shown in said figure, and to locate the arm 5b between said bosses 4b.

The plate 4 is preferably positioned nearly in front of the driver, at ready reach for operation before turning the vehicle in either a left or right direction as a warning signal to pedestrians or vehicles.

We claim:

1. In a signaling device, in combination, an electric battery, a rockable arm carrying differentially distinguished electric signal lamps in make and break association with the battery, means for rocking said arm including a rockable insulating sector secured angularly to the arm and a handle secured to the sector, a pair of movable contacts mounted on the sector with a conductor connecting them, and pairs of stationary contacts separately in circuit with the lamps and positioned within the scope of rocking travel of the movable contacts to close a circuit through one or the other of the lamps in one or the other of two raised positions and open the circuits in all other positions.

2. In a signaling device, in combination, an electric battery, a rockable arm carrying differentially distinguished electric signal lamps in make and break association with the battery, means for rocking said arm including a rockable insulating sector secured angularly to the arm and a handle secured to the sector, a pair of movable contacts mounted on the sector with a conductor connecting them, and pairs of stationary contacts separately in circuit with the lamps and positioned within the scope of rocking travel of the movable contacts to close a circuit through one or the other of the lamps in one or the other of two raised positions and open the circuits in all other positions, and means for releasably retaining the sector when the signal is in the down position.

BEEGLE T. ROSEBERRY.
CHRIST H. KOWALSKI.